UNITED STATES PATENT OFFICE 1,971,009

PROCESS FOR THE PREPARATION OF ALKALI CYANATES

Hermann Theodor Joseph König, Dordrecht, Netherlands, assignor to N. V. Stikstofbindingsindustrie "Nederland," Dordrecht, Netherlands, a company of the Netherlands No Drawing. Application February 6, 1932, Serial No. 591,462. In the Netherlands February 9, 1931

12 Claims. (Cl. 23—75)

It is known that by the reaction of carbonic acid and ammonia on alkali metal carbonates at elevated temperature alkali metal cyanates are obtained. This reaction, however, has never found a practical application as the yield is unsatisfactory (see Mixter: American Chemical Journal Vol. 4, 1882).

It has now been found that a much better yield can be obtained in this reaction if care is taken to counteract the presence or formation of water in this reaction, for instance by adding a substance capable of reaction with water.

It has also been found that it is not necessary to use alkali metal carbonates but that cyanates are also formed and even with a higher yield, because less water is formed, if a mixture of ammonia gas and carbon dioxide is caused to react with other alkali metal salts than carbonates, such as for instance alkali metal sulfides, -cyanides, -sulfites, -thiosulfates, -nitrites, etc. at elevated temperature (for instance temperatures of 300–800° C. and that astonishing high yields of alkali cyanate may be obtained.

If a mixture of gaseous ammonia and carbon dioxide reacts, for instance on sodium cyanide, there is formed sodium cyanate besides ammonium cyanide, the latter escaping in gaseous condition.

When using sodium sulfide there is formed sodium cyanate and ammonium sulfide which escapes in gaseous condition. In this case the sodium cyanate is contaminated with some sodium rhodanide. From these reactions it is clear that by the action of a mixture of ammonia gas and carbon dioxide on alkali metal salts substantially cyanates are formed. The ammonia salts of the acids of the used alkali metal salts escape in volatile condition with the water formed in the reaction.

For sodium cyanide the reaction probably runs according to the equation:

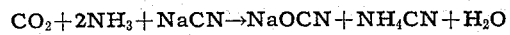

$$CO_2 + 2NH_3 + NaCN \rightarrow NaOCN + NH_4CN + H_2O$$

As in the above mentioned reaction also a molecule of water is formed, which has a decomposing action on the formed cyanate, it is advantageous to use an excess of one of the gases or of both (by increasing the velocity of the gaseous mixture sufficiently with respect to the velocity of the desired reaction so that there remains a substantial excess of the reacting gases in the gaseous reaction products), or to add inert gases or gases promoting the reaction such as nitrogen, hydrogen, carbon monoxide, hydrocarbons and the like, in order to remove the water quickly or to react chemically with it. It is clear that the gaseous mixture before reacting with the alkali metal salts should be free from water and therefore the gaseous mixture obtained in the reaction can only be used again when it has been freed from water and other reaction products, such as by cooling or absorption or chemical reactions. The quantity of water formed in the reaction is especially high if carbonates are used as alkali salts, because in this case no ammonium salt (ammonium carbonate) is formed, but its products of decomposition, $NH_3$, $CO_2$ and $H_2O$. Therefore the addition of substances reacting with the water formed is especially important if alkali metal carbonates are used.

Especially in this case the yield of alkali metal cyanate is much increased by adding carbon monoxide to the gaseous mixture reacting with the alkali metal salt. The principal reaction is:

$$Na_2CO_3 + CO_2 + 2NH_3 \rightleftarrows 2NaCNO + 3H_2O$$

By the addition of CO the reaction takes place

$$CO + H_2O = CO_2 + H_2.$$

This reaction decreases the $H_2O$-content and increases the $CO_2$-content and therefore promotes the principal reaction.

The action of the gas mixture on the alkali metal salt may be carried out at atmospheric pressure but in some cases it may be preferable to use superatmospheric or even very high pressures. The salt on which the gaseous mixture is caused to react may be in solid condition or it may be dissolved or suspended in a liquid such as ammonia, alcohol or the like, so that the conversion into the cyanate takes place in this liquid. In this case it will often be necessary to use high pressures in order to prevent the vaporization of the solvent.

The alkali metal salt or mixture of alkali metal salts can also be used in molten condition with or without addition of substances decreasing the melting point. The alkali metal salt may also be used in the form of briquettes, mixed with inert or substantially inert substances, not melting at the used temperature and having a beneficial action on the yield of the reaction by increasing the exposed surface of the alkali salt, such as for instance carbon, alkaline earth oxides, magnesium oxide, etc. Calcium oxide has a beneficial action if alkali metal sulfides are used, because it promotes the formation of alkali metal cyanates by conversion of any rhodanides formed into cyanates with formation of calcium sulfide. Also catalytic substances may be added such as metals or metal compounds, which probably promote the activity of the ammonia gas.

Instead of mixtures of ammonia gas and carbon dioxide, mixtures of ammonia gas with carbon oxysulfide may be used, in which case also cyanates are formed, besides ammonia salts and hydrogen sulfide. This is also a means of preventing the formation of the detrimental water.

*Example 1*

Through a melt consisting of 25% sodium cyanate and 75% sodium sulfide a gaseous mixture containing 30% by volume of carbon dioxide and 70% by volume of ammonia gas is carried at a temperature of 650° C. until all the sulfide is decomposed.

*Example 2*

Through a melt containing 25% sodium cyanate and 75% sodium carbonate a gaseous mixture containing 20% by volume of ammonia gas, 40% by volume of carbon dioxide and 40% by volume of carbon monoxide is carried at a temperature of 650° C. until substantially all the carbonate is converted.

What I claim is:—

1. Process of preparing alkali metal cyanate which comprises conducting over an alkali metal salt at a temperature between 300 and 800° C. a gaseous mixture of ammonia gas and carbon dioxide, in which one of the gases is in substantial excess over the other with respect to the desired reaction.

2. Process of preparing alkali metal cyanate which comprises conducting a gaseous mixture of ammonia gas and carbon dioxide at a temperature between 300 and 800° C. over an alkali metal salt mixed with a substantially inert substance not melting at the used temperature and having a beneficial action on the yield of the reaction by increasing the exposed surface of the alkali salt.

3. Process of preparing alkali metal cyanate which comprises conducting a gaseous mixture of ammonia gas and carbon dioxide at a temperature between 300 and 800° C. over an alkali metal salt mixed with magnesium oxide.

4. Process of preparing alkali metal cyanate which comprises conducting a gaseous mixture of ammonia gas and carbon dioxide at a temperature between 300 and 800° C. over an alkali metal salt mixed with substances lowering the melting point of the alkali metal salt.

5. Process of preparing alkali metal cyanate which comprises conducting a gaseous mixture of ammonia gas and carbon dioxide at a temperature between 300 and 800° C. over an alkali metal sulfide mixed with calcium oxide.

6. Process of preparing alkali metal cyanate which comprises conducting a gaseous mixture of ammonia gas and carbon dioxide at a temperature between 500 and 800° C. over an alkali metal salt in the presence of a substance capable of reacting with water.

7. Process of preparing alkali metal cyanate which comprises conducting a gaseous mixture of ammonia gas and carbon dioxide and carbon monoxide at a temperature between 500 and 800° C. over an alkali metal salt.

8. Process of preparing alkali metal cyanate which comprises conducting a gaseous mixture of ammonia gas, carbon dioxide and carbon monoxide at a temperature between 500 and 800° C. over an alkali metal carbonate.

9. Process of preparing alkali metal cyanate which comprises conducting a gaseous mixture of ammonia gas and carbon dioxide at a temperature between 300 and 800° C. over an alkali metal salt of an oxygen-free weak acid.

10. Process of preparing alkali metal cyanate which comprises conducting a gaseous mixture of ammonia gas and carbon dioxide at a temperature between 300 and 800° C. over alkali metal sulfide.

11. Process of preparing alkali metal cyanate which comprises conducting a gaseous mixture of ammonia gas and carbon dioxide at a temperature between 300 and 800° C. over alkali metal cyanide.

12. Process of preparing alkali metal cyanate which comprises conducting a gaseous mixture of ammonia gas, carbon dioxide and carbon monoxide at a temperature between 500 and 800° C. over an alkali metal salt of an oxygen-free weak acid.

HERMANN THEODOR JOSEPH KÖNIG.